United States Patent
Kim

(10) Patent No.: US 10,427,514 B2
(45) Date of Patent: Oct. 1, 2019

(54) ENGINE MOUNT

(71) Applicants: Hyundai Motor Company, Seoul (KR); Kia Motors Corporation, Seoul (KR)

(72) Inventor: Jin-Woo Kim, Suwon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 40 days.

(21) Appl. No.: 15/667,396

(22) Filed: Aug. 2, 2017

(65) Prior Publication Data

US 2018/0162212 A1    Jun. 14, 2018

(30) Foreign Application Priority Data

Dec. 12, 2016  (KR) .......................... 10-2016-0168481

(51) Int. Cl.
*F16F 5/00* (2006.01)
*B60K 5/12* (2006.01)
(Continued)

(52) U.S. Cl.
CPC .............. *B60K 5/1208* (2013.01); *B60K 5/12* (2013.01); *B60K 5/1233* (2013.01);
(Continued)

(58) Field of Classification Search
CPC .......... F16F 13/08; F16F 13/10; F16F 13/102; F16F 13/106; F16F 13/107; F16F 13/18;
(Continued)

(56) References Cited

U.S. PATENT DOCUMENTS 5,316,275 A * 5/1994 Maeno ................. F16F 13/108
267/140.13
6,523,814 B2 * 2/2003 Kodama ............... F16F 13/105
267/140.13
(Continued)

FOREIGN PATENT DOCUMENTS

DE    10-2014-116754 A1    5/2016
EP       0409707 A1 *   1/1991   .............. F16F 13/06
(Continued)

OTHER PUBLICATIONS

Machine translation of JP 2009-041666 (no date).*
Machine translation of EP 0409707 (no date).*

*Primary Examiner* — Nicholas J Lane
(74) *Attorney, Agent, or Firm* — Morgan, Lewis & Bockius LLP

(57) ABSTRACT

An engine mount apparatus may include a mount housing which has an internal space; a partition device which partitions the internal space into an upper space and a lower space; a nozzle plate which is provided in the upper space and allows a fluid to selectively pass through the nozzle plate; an upper diaphragm which is fastened to an upper surface of the nozzle plate and defines an upper liquid chamber; a core which penetrates the partition device, and has an upper portion disposed in the upper space, and a lower portion disposed in the lower space; a lower diaphragm which extends from the upper portion of the core to a lower surface of the nozzle plate, and defines a lower liquid chamber; and a rubber member which is provided in the upper space, and connects the upper portion of the core and the partition device.

14 Claims, 13 Drawing Sheets

(51) Int. Cl.
*F16F 13/10* (2006.01)
*F16F 13/14* (2006.01)

(52) U.S. Cl.
CPC .......... *B60K 5/1283* (2013.01); *B60K 5/1291* (2013.01); *F16F 13/10* (2013.01); *F16F 13/101* (2013.01); *F16F 13/102* (2013.01); *F16F 13/107* (2013.01); *F16F 13/14* (2013.01); *F16F 2224/025* (2013.01); *F16F 2230/0005* (2013.01); *F16F 2230/48* (2013.01)

(58) Field of Classification Search
CPC .. B60K 5/1208; B60K 5/1283; B60K 5/1233; B60K 5/1291
See application file for complete search history.

(56) References Cited

U.S. PATENT DOCUMENTS

| | | | | |
|---|---|---|---|---|
| 2009/0079117 A1* | 3/2009 | Adams | ................. | F16F 13/268 267/140.14 |
| 2013/0292888 A1* | 11/2013 | Hwang | ................. | F16F 13/105 267/140.13 |
| 2016/0238103 A1* | 8/2016 | Kim | ................. | F16F 13/106 |

FOREIGN PATENT DOCUMENTS

| | | | | |
|---|---|---|---|---|
| JP | 2004-263783 A | | 9/2004 | |
| JP | 2009041666 A | * | 2/2009 | ............. F16F 13/10 |
| KR | 10-2004-0006868 A | | 1/2004 | |
| KR | 10-0969080 B1 | | 7/2010 | |
| WO | WO-2015068730 A1 | * | 5/2015 | ............. F16F 13/10 |

\* cited by examiner

ENGINE MOUNT

CROSS-REFERENCE TO RELATED APPLICATIONS

The present application claims priority to Korean Patent Application No. 10-2016-0168481, filed on Dec. 12, 2016, the entire contents of which is incorporated herein for all purposes by this reference.

BACKGROUND OF THE INVENTION

Field of the Invention

The present invention relates to an engine mount which is mounted on a vehicle body so as to support an engine, and may change damping characteristics in accordance with characteristics of vibration transmitted from the engine.

Description of Related Art

An engine of a vehicle is installed in an engine room of a vehicle body by an engine mount in order to attenuate vibration in the engine. The engine mount applied to the vehicle may be classified into a rubber mount which attenuates vibration by using elastic force of a rubber device, and a fluid-filled mount (hydraulic mount) which attenuates vibration by using an encapsulated hydraulic liquid.

FIG. 1A and FIG. 1B are a view illustrating a state in which an engine mount in the prior art is disposed in an engine room, and FIG. 2 is a cross-sectional view of the engine mount in the prior art. Referring to FIGS. 1A and 1B and FIG. 2, engine mounts 1 in the prior art are installed at both sides of an engine 2 disposed at a center of an engine room, and connect the engine 2 to a vehicle body 3. A turbocharger 4, which introduces outside air into the engine 2 by using rotational force generated by pressure of exhaust gas discharged from the engine 2, is disposed above the engine mount 1, and a catalyst converter such as a warm-up catalytic converter (WCC) 5 is disposed at one side of the turbocharger 4. Because the high-temperature exhaust gas discharged from the engine 2 flows through the turbocharger 4 and the WCC 5, the turbocharger 4 and the WCC 5 are considered as high-temperature heat sources, and continuously emit heat to peripheral devices such as the engine mount 1.

Meanwhile, heat is continuously transmitted (by radiation or convection) from the heat sources to a core 7 and an insulator 8 provided at an upper side of the engine mount 1, and the heat, which is transmitted to the core 7 and the insulator 8, is transmitted to a rubber member 9.

Because the engine mount 1 in the prior art uses the rubber member made of a natural rubber material, there may be problems in that there is a limitation in view of heat resistance performance, noise, vibration, and harshness (NVH) performance deteriorates because of a change in characteristics of the rubber member when the rubber member is exposed to a high temperature over a long period of time, and durability deteriorates because of degradation of the rubber member made of a rubber material.

Recently, there has been an attempt to improve heat radiating performance by installing a heat radiating device 8A at an outer circumference of the insulator 8, but there is a problem in that it is impossible to perfectly block the transmitted heat because the core 7 protrudes upward from the engine mount 1 so that the engine mount 1 is fastened to an engine bracket 2A.

Meanwhile, recently, a rubber device, which is made of a silicone material instead of natural rubber, has been proposed to improve heat resistance performance of the engine mount. However, there are problems in that durability deteriorates because oil resistance is poor due to the nature of the silicone material, and abnormal noise occurs in a liquid chamber because gas in the silicone material is naturally emitted, so that characteristics of the rubber member are changed.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a structure of an engine mount configured for blocking heat transfer from an external heat source to a rubber device.

Various aspects of the present invention are directed to providing a structure of an engine mount configured for preventing a rubber member from being damaged by an encapsulated fluid.

Various aspects of the present invention are directed to providing an engine mount including: a mount housing which has an internal space; a partition device which partitions the internal space into an upper space and a lower space; a nozzle plate which is provided in the upper space and allows a fluid to selectively pass through the nozzle plate; an upper diaphragm which is fastened to an upper surface of the nozzle plate and defines an upper liquid chamber; a core which penetrates the partition device, and has an upper portion disposed in the upper space, and a lower portion disposed in the lower space; a lower diaphragm which extends from the upper portion of the core to a lower surface of the nozzle plate, and defines a lower liquid chamber; and a rubber member which is provided in the upper space, and connects the upper portion of the core and the partition device.

The engine mount may further include a support bracket of which one side is disposed in the lower space so as to penetrate a lateral side of the mount housing, and fastened to the core device, in which the core device presses a lower side of the lower liquid chamber by a movement of the support bracket.

A lower portion of the mount housing may be fastened to a vehicle body, and an upper portion of the mount housing may be disposed to be directed toward a heat source.

The rubber member may be made of a silicone material.

The engine mount may further include a heat radiating device which is fastened to an upper side of the mount housing, and prevents heat transfer from the heat source to an internal of the mount housing.

The support bracket may include a core fastening portion which is fastened to the lower portion of the core, and an engine fastening portion which extends from the core fastening portion and is fastened to an engine, and the core fastening portion may include a first stopper which protrudes upward from an upper surface of the core fastening portion, and a second stopper which protrudes downward from a lower surface of the core fastening portion.

The first stopper may come into contact with the partition device when the support bracket moves upward by a predetermined distance, and the second stopper may come into contact with a lower surface of the mount housing when the support bracket moves downward by a predetermined distance, such that the movement of the support bracket may be restricted.

The core may be formed so that a cross section thereof has a 'Y' shape, and the lower diaphragm may extend from an upper end portion of the core to a rim portion of the lower surface of the nozzle.

External threads may be provided on the lower portion of the core, and a fastening member, which has internal threads, may be coupled to the lower portion of the core that penetrates the support bracket.

The present invention having the configurations adopts a reversal structure, and as a result, it is possible to effectively block heat transmitted from an external heat source to the rubber device.

Since the core device directly pumps the fluid in the lower liquid chamber, it is possible to improve damping performance, and to improve durability and sealing performance by reducing a length of the diaphragm.

Since the support bracket is fastened to a lower side of the engine mount, it is possible to reduce a level difference, and it is advantageous in view of rigidity at an input point.

The methods and apparatuses of the present invention have other features and advantages which will be apparent from or are set forth in more detail in the accompanying drawings, which are incorporated herein, and the following Detailed Description, which together serve to explain certain principles of the present invention.

Figures 1A, 1B:
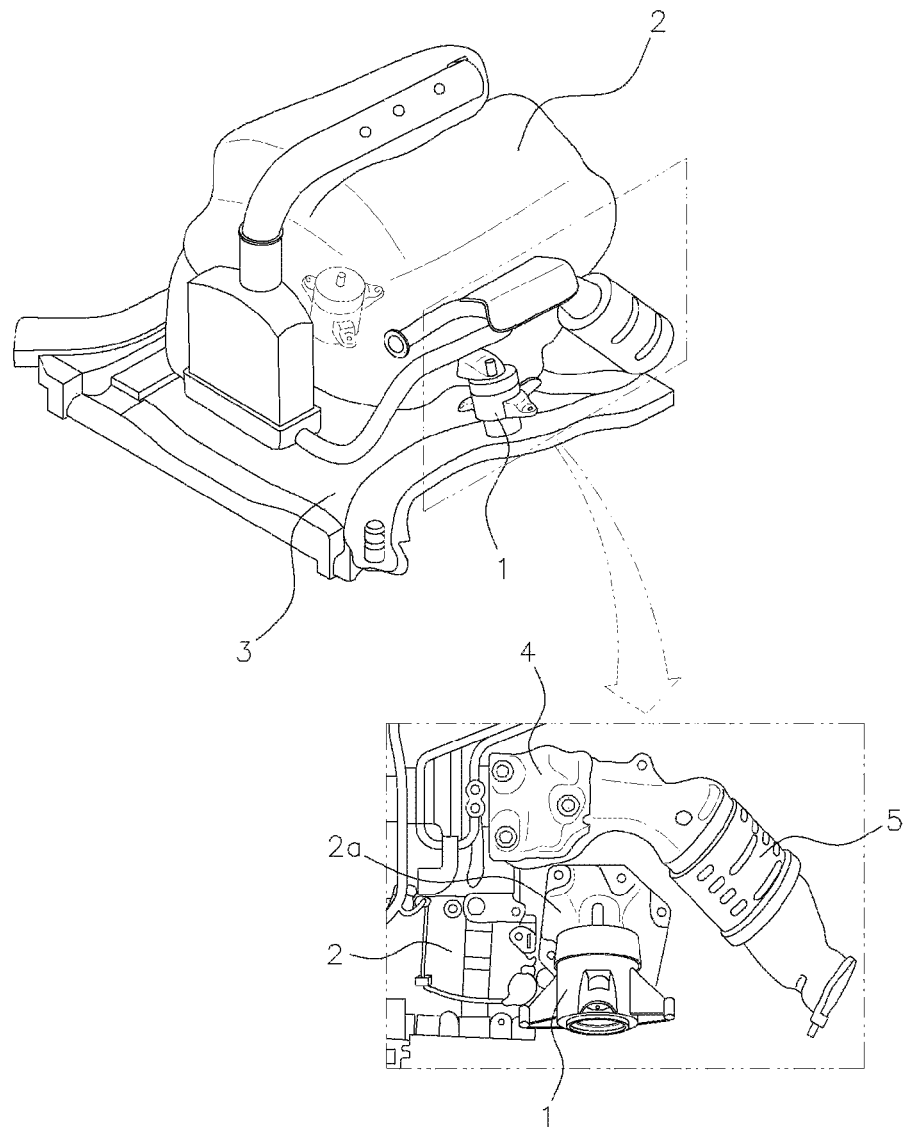
FIG. 1A and FIG. 1B are a view illustrating a state in which an engine mount in the prior art is disposed in an engine compartment.
Figure 2:
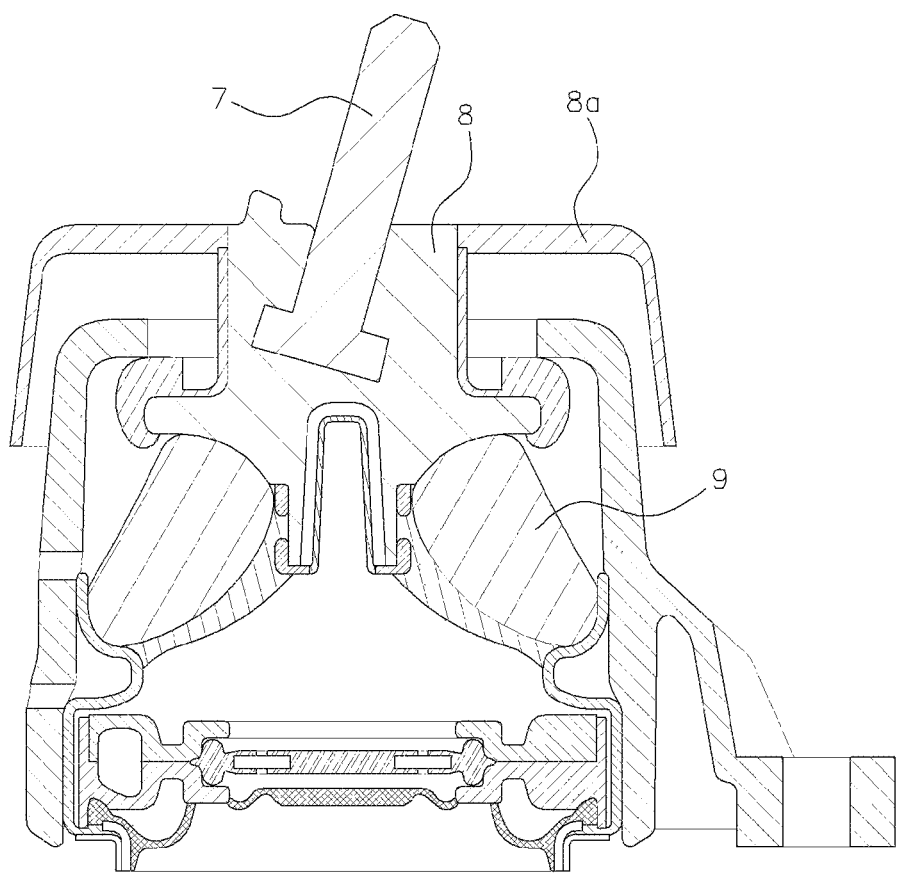
FIG. 2 is a cross-sectional view of the engine mount in the prior art.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is intended to cover not only the exemplary embodiments, but also various alternatives, modifications, equivalents and other embodiments, which may be included within the spirit and scope of the invention as defined by the appended claims.

Figure 3:
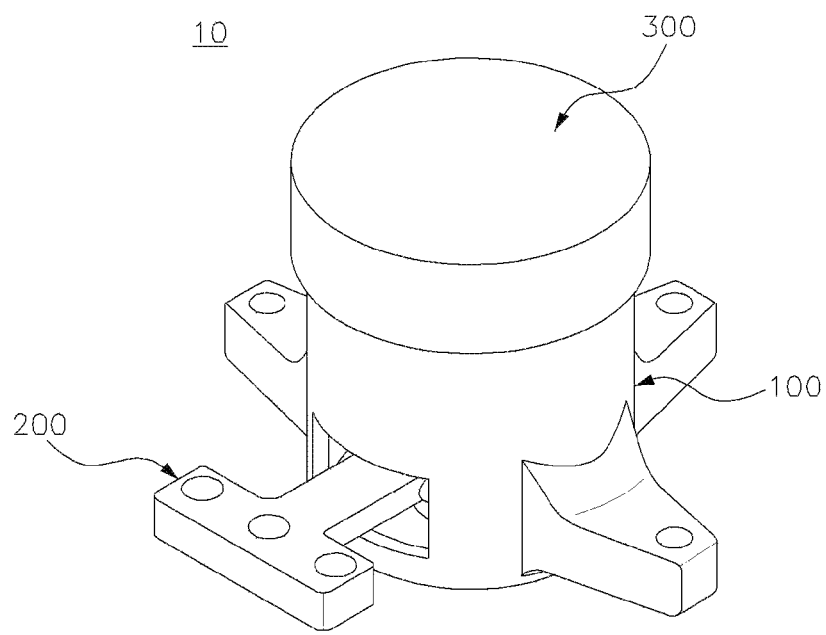
FIG. 3 is a perspective view of an engine mount according to an exemplary embodiment of the present invention.
Figure 4:
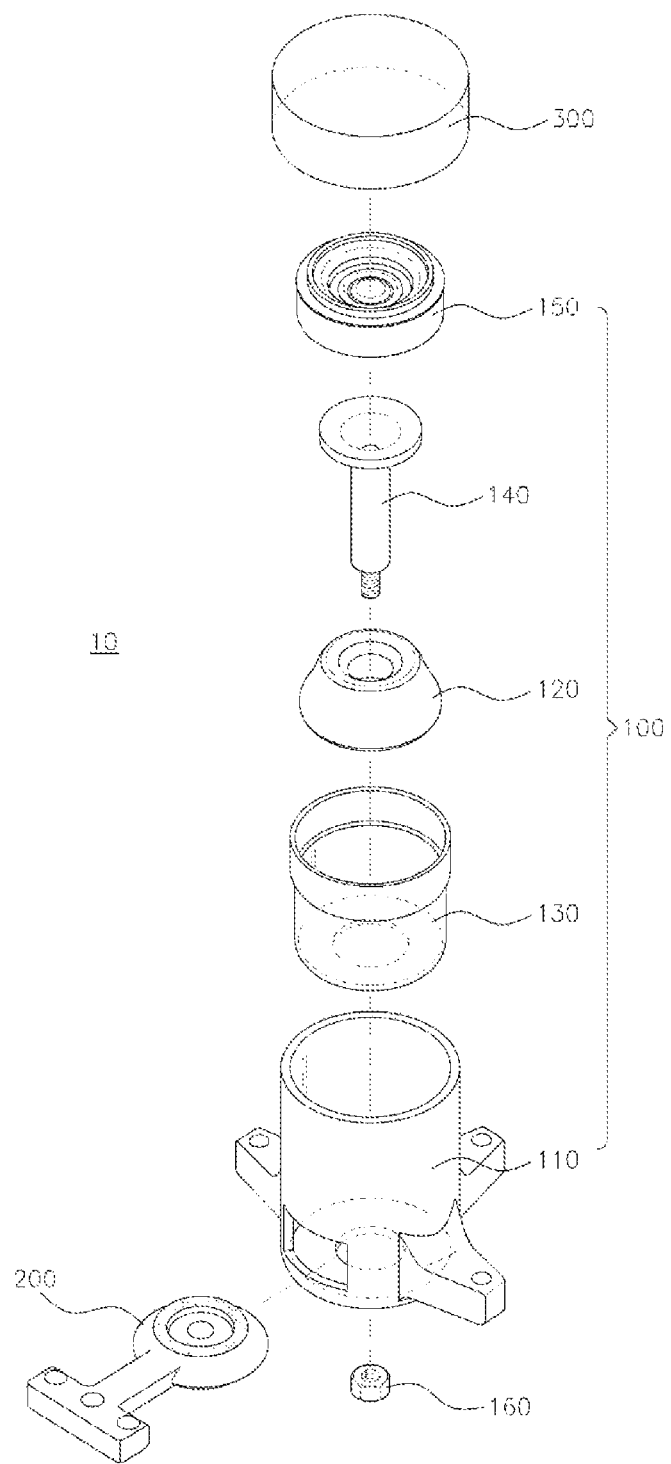
FIG. 4 is an exploded perspective view of the engine mount according to the exemplary embodiment of the present invention.
Figure 5:
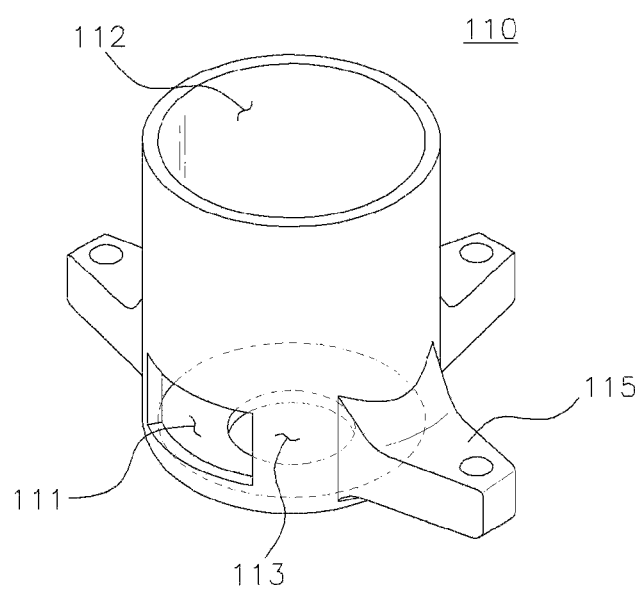
FIG. 5 is a perspective view of a mount housing according to the exemplary embodiment of the present invention.
Figure 6:
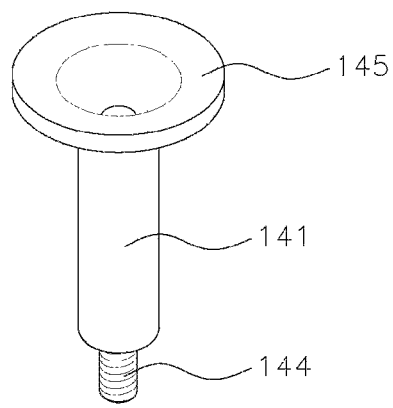
FIG. 6 is a perspective view of a core device according to the exemplary embodiment of the present invention.
Figure 7:
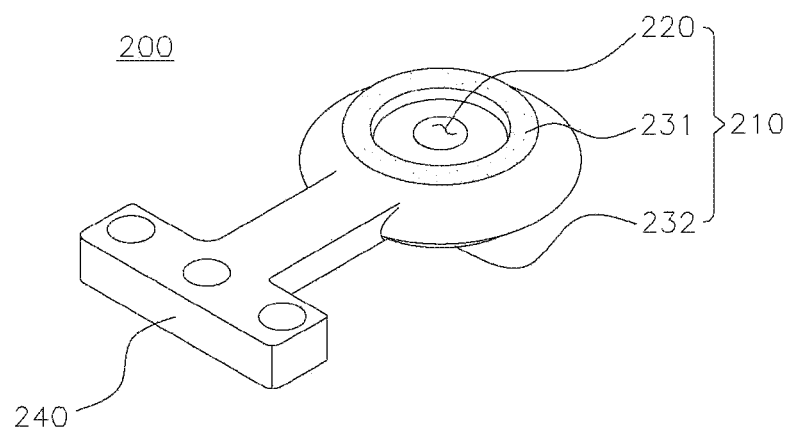
FIG. 7 is a perspective view of a support bracket according to the exemplary embodiment of the present invention.
Figure 8:
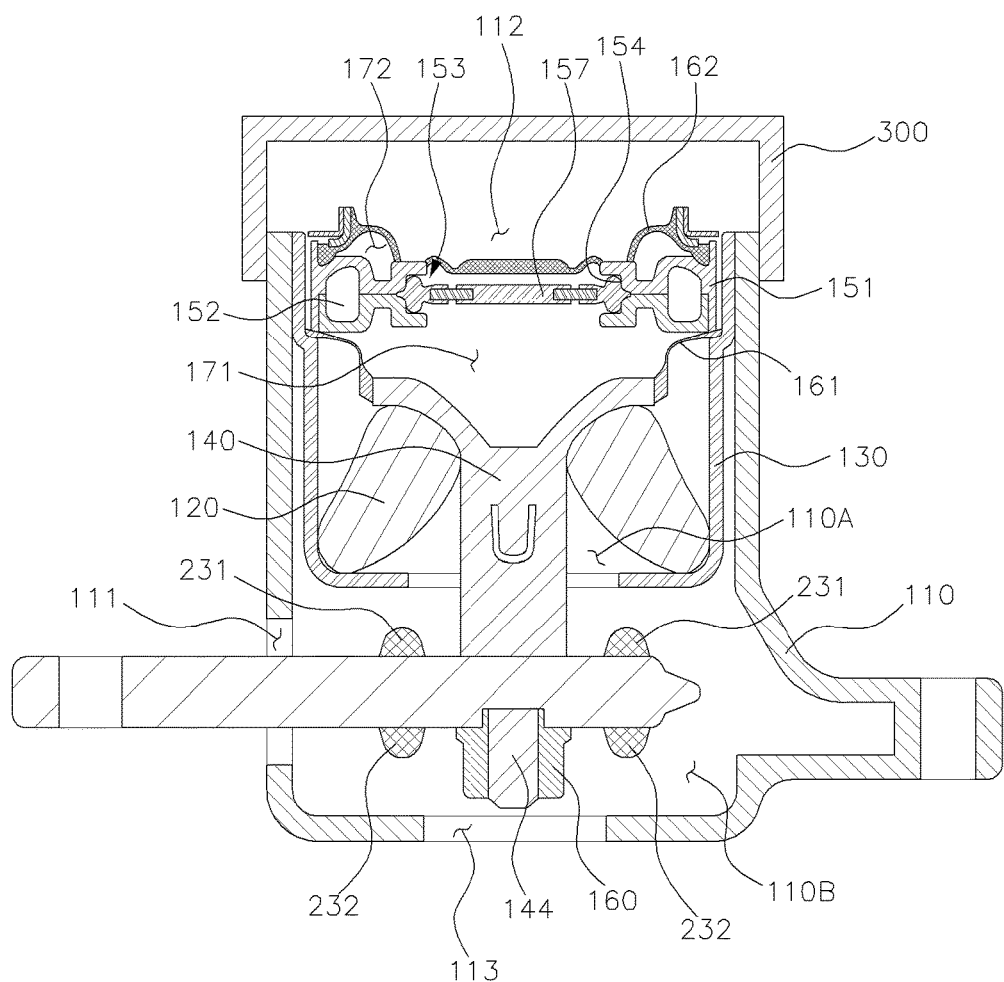
FIG. 8 is a cross-sectional view of the engine mount according to the exemplary embodiment of the present invention.

FIG. 3 is a perspective view of an engine mount according to an exemplary embodiment of the present invention, FIG. 4 is an exploded perspective view of the engine mount according to the exemplary embodiment of the present invention, FIG. 5 is a perspective view of a mount housing according to the exemplary embodiment of the present invention, FIG. 6 is a perspective view of a core device according to the exemplary embodiment of the present invention, FIG. 7 is a perspective view of a support bracket according to the exemplary embodiment of the present invention, and FIG. 8 is a cross-sectional view of the engine mount according to the exemplary embodiment of the present invention.

Referring to FIGS. 3 to 8, an engine mount 10 according to an exemplary embodiment of the present invention includes a mount main body 100 which is connected to a vehicle body, and a support bracket 200 which connects the mount main body 100 to an engine. In addition, the engine mount 10 may further include a heat radiating device 300 which is disposed at one side of the mount main body 100 and prevents heat transfer from a heat source.

The mount main body 100 includes a mount housing 110 which has an internal space, a partition device 130 which partitions the internal space into an upper space 110A and a lower space 110B, a core device 140 which penetrates the partition device 130, a rubber member 120 which connects the partition device 130 and the core device 140, and a nozzle device 150 which defines a liquid chamber together with the core device 140.

The mount housing 110 may be formed in a cylindrical shape, and the mount housing 110 may have a first opening 111 which is opened toward one side, a second opening 112 which is opened upward, and a third opening 113 which is opened downward.

The first opening 111 is opened to extend a support bracket 200, which will be described below, to the lower space 110B of the mount housing 110, the second opening 112 is opened to dispose internal components of the engine mount 10 in the upper space 110A of the mount housing 110, and the third opening 113 is opened to mount a fastening member 160, which will be described below, in the engine mount.

Vehicle body fastening portions 115 through which the mount main body 100 is fastened to the vehicle body may be provided on an outer circumferential surface of the mount housing 110. In the present exemplary embodiment, the mount housing 110 and the vehicle body fastening portions 115 are illustrated as being integrally formed, but it may be understood that the vehicle body fastening portions 115 are configured as separate components, and then fastened to an external surface of the mount housing 110.

Meanwhile, a lower portion of the mount housing 110 may be fastened to the vehicle body, and an upper portion of the mount housing 110 may be disposed to be directed toward a heat source such as a charger or a WCC.

The partition device 130 may partition the internal space of the mount housing 110 into the upper space 110A and the lower space 110B. In the instant case, the upper space 110A may mean a space of the internal space which is closer to the heat source based on the partition device 130, and the lower space 110B may mean a space of the internal space which is farther from the heat source based on the partition device 130.

The partition device 130 may be provided at an internal circumference of the mount housing 110, and may protrude by a predetermined distance inward from an internal circumferential surface of the mount housing 110. An opening may be provided at a center portion of the partition device 130, and the core device 140 to be described below may be inserted into the opening.

The core device 140 may include a core main body 141 which extends in up and down directions, a joint portion 145 which is coupled to an upper end portion of the core main body 141, and a bolt portion 144 which is coupled to a lower end portion of the core main body 141.

A cross section of the core device 140 may be formed in an approximately 'Y' shape, the rubber member 120 to be described below may be coupled to a lower surface of the joint portion 145, and a lower diaphragm 161 to be described below may be coupled to an upper end portion of the joint portion 145. In the instant case, the upper end portion of the joint portion 145 may mean an external end of an upper portion of the joint portion.

Meanwhile, the bolt portion 144 may have external threads, and may have a diameter smaller than a diameter of the core main body 141. The bolt portion 144 is coupled with the fastening member 160 to be described below.

The core main body 141 and the joint portion 145 may be integrally formed, and the joint portion 145 and a portion of the core main body 141, which is adjacent to the joint portion 145, may be understood as an upper portion of the core device 140. On the contrary, the bolt portion 144 and the remaining portion of the core main body 141, which is adjacent to the bolt portion 144, may be understood as a lower portion of the core device 140.

The rubber member 120 may be disposed in the upper space 110A of the mount housing 110, and may be formed in a cylindrical shape in which a diameter of a lower portion thereof is greater than a diameter of an upper portion thereof. That is, the rubber member 120 may be formed in a reversed funnel shape. In addition, the rubber member 120 may be made of a silicone material.

An upper end portion of the rubber member 120 is coupled to the joint portion 145 of the core device 140. The joint portion 145 of the core device 140 may be formed to surround the upper end portion of the rubber member 120.

A lower end portion of the rubber member 120 is supported on the partition device 130, and disposed in the internal space of the mount housing 110. As illustrated in FIGS. 4 and 8, the partition device 130 may be formed in a cylindrical shape that has openings at upper and lower sides thereof. The partition device 130 may be formed such that a center portion of a lower surface thereof is opened, and a rim portion of the lower surface is closed.

The lower end portion of the rubber member 120 may be supported on a portion which is bent from a lateral portion of the partition device 130 to the rim portion of the lower surface of the partition device. An upper portion of the partition device 130 may be fixed to internal surface of the mount housing 110.

Meanwhile, the nozzle device 150 is provided at an upper side of the rubber member 120. The nozzle device 150 includes a nozzle plate 151 which partitions the upper space 110A defined by the partition device 130, a first flow path 153 which is formed at a center portion of the nozzle plate 151, and a second flow path 152 which is formed in a rim portion of the nozzle plate. As an example, the first flow path 153 may have an opening formed at the center portion of the nozzle plate 151, a membrane may be formed to be inserted into the opening, and the second flow path 152 may be formed as an annular flow path having orifice.

An upper diaphragm 162, which is fastened to an upper surface of the nozzle plate 151, may be provided at an upper side of the nozzle plate 151, and the upper diaphragm 162 and the upper surface of the nozzle plate 151 define an upper liquid chamber 172. In contrast, the lower diaphragm 161, which extends from a lower surface of the nozzle plate 151 to the upper end portion of the core device 140, may be provided at a lower side of the nozzle plate 151, and the joint portion 145 of the core device 140, the lower diaphragm 161, and the lower surface of the nozzle plate 151 define a lower liquid chamber 171.

Operations of the lower liquid chamber 171 and the upper liquid chamber 172 will be described below.

The support bracket 200 includes a core fastening portion 210 to which the core device 140 is fastened, and an engine fastening portion 240 which extends from the core fastening portion 210 and is coupled to the engine.

The support bracket 200 penetrates the first opening 111 of the mount housing 110, and the core fastening portion 210 is inserted into the lower space 110B of the mount housing 110. In the instant case, the core fastening portion 210 is disposed in a space between the partition device 130 and a lower surface of the mount housing 110.

The core fastening portion 210 includes a core fastener 220 which is formed to penetrate the support bracket 200 in the up and down directions, and stoppers 231 and 232 which are formed at a rim portion of the core fastener 220.

The bolt portion 144 of the core device 140 penetrates the core fastener 220, and the fastening member 160 may be fastened to the bolt portion 144 that penetrates the core fastener 220. The bolt portion 144 and the fastening member 160 are thread-coupled to each other. The core device 140 and the support bracket 200 may be coupled to each other so that extension directions thereof are not coincident with each other. As an example, the core device 140 and the support bracket 200 are fastened to each other so as to be perpendicular to each other.

The stoppers 231 and 232 may include a first stopper 231 which protrudes upward from an upper surface of the core fastening portion 210, and a second stopper 232 which protrudes downward from a lower surface of the core fastening portion 210.

The first stopper 231 is distanced from the partition device 130 in the up and down directions at a predetermined distance, and the second stopper 232 is distanced from the lower surface of the mount housing 110 in the up and down directions at a predetermined distance.

When the support bracket 200 moves upward by a predetermined distance or longer, the first stopper 231 comes into contact with the lower surface of the partition device 130 and restricts the movement of the support bracket 200, and when the support bracket 200 moves downward by a predetermined distance or longer, the second stopper 232 comes into contact with the lower surface of the mount housing 110 and restricts the movement of the support bracket 200.

Meanwhile, the fastening member 160 is inserted into the lower space 110B of the mount housing 110 through the third opening 113, and fastened to the bolt portion 144 of the core device 140.

The heat radiating device 300 is disposed at an upper side of the mount main body 100, and prevents heat at an upper side of the heat radiating device 300 from being transferred to a lower side of the heat radiating device 300. That is, the heat radiating device 300 may be disposed to close the second opening 112 of the mount housing 110. In the instant case, the heat radiating device 300 and the nozzle device 150 are disposed to be distanced from each other at a predetermined distance, and the upper liquid chamber 172 may be provided in a space between the heat radiating device 300 and the nozzle device 150.

FIGS. 9 to 12 are views illustrating an operation of the engine mount according to the exemplary embodiment of the present invention. Referring to FIGS. 9 to 12, when the core device 140 is minutely displaced and thus a pressure difference equal to or lower than a reference pressure occurs between the lower liquid chamber 171 and the upper liquid chamber 172, the lower liquid chamber 171 and the upper liquid chamber 172 communicate with each other through the first flow path 153 formed in the space between the membrane 157 of the nozzle device 150 and the nozzle plate 151.

Figure 10:
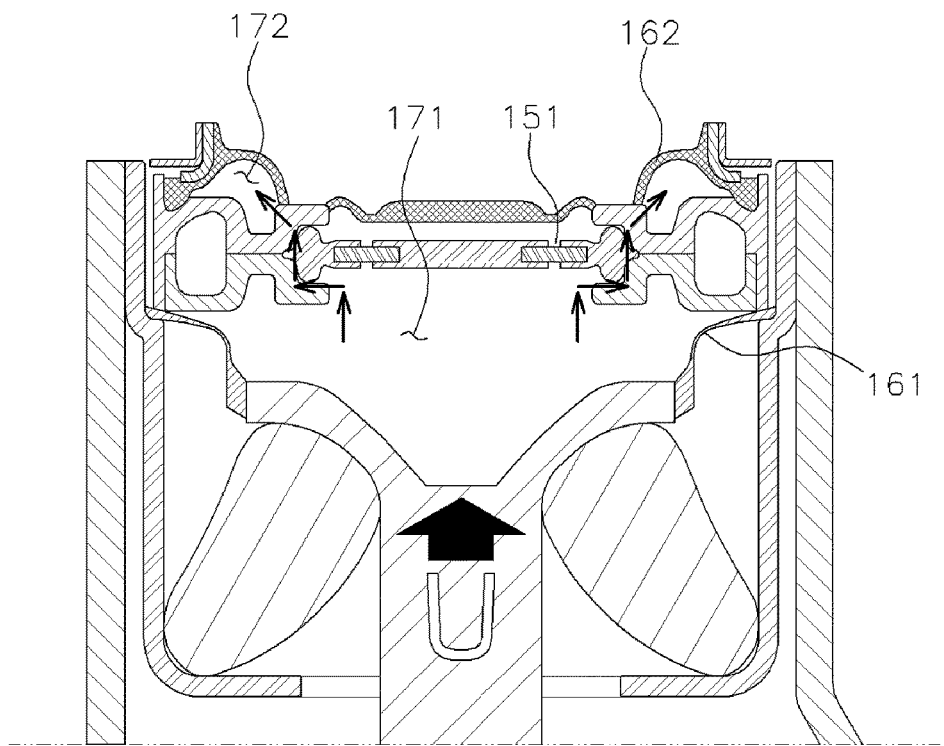
FIG. 10, FIG. 11, and FIG. 12, and FIG. 13 are views illustrating an operation of the engine mount according to the exemplary embodiment of the present invention.
Figure 11:
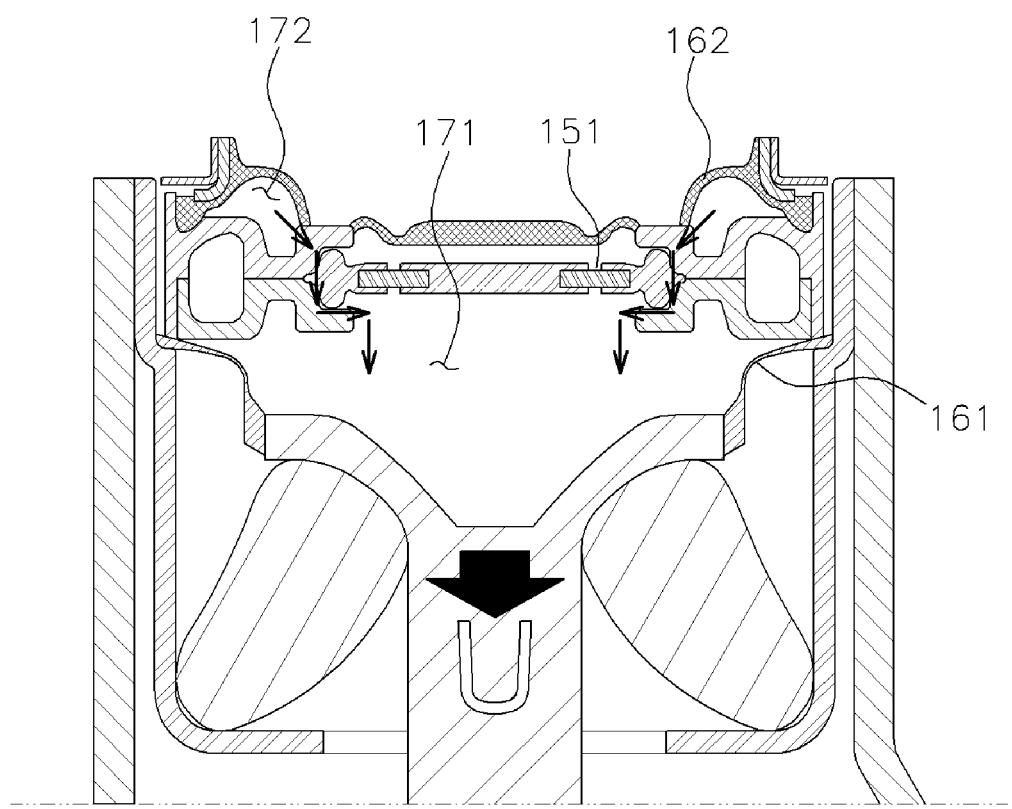

That is, as illustrated in FIG. 10, when the core device 140 is minutely displaced upward and thus pressure in the lower liquid chamber 171 becomes higher than pressure in the upper liquid chamber 172, the fluid in the lower liquid chamber 171 flows to the upper liquid chamber 172 through the first flow path 153 but rarely through the second flow path 152 due to the orifice of the second flow path 152. On the contrary, as illustrated in FIG. 11, when the core device 140 is minutely displaced downward and thus pressure in the upper liquid chamber 172 becomes lower than pressure in the lower liquid chamber 171, the fluid in the upper liquid chamber 172 flows to the lower liquid chamber 171 through the first flow path 153 but rarely through the second flow path 152 due to the orifice of the second flow path 152.

Figure 12:
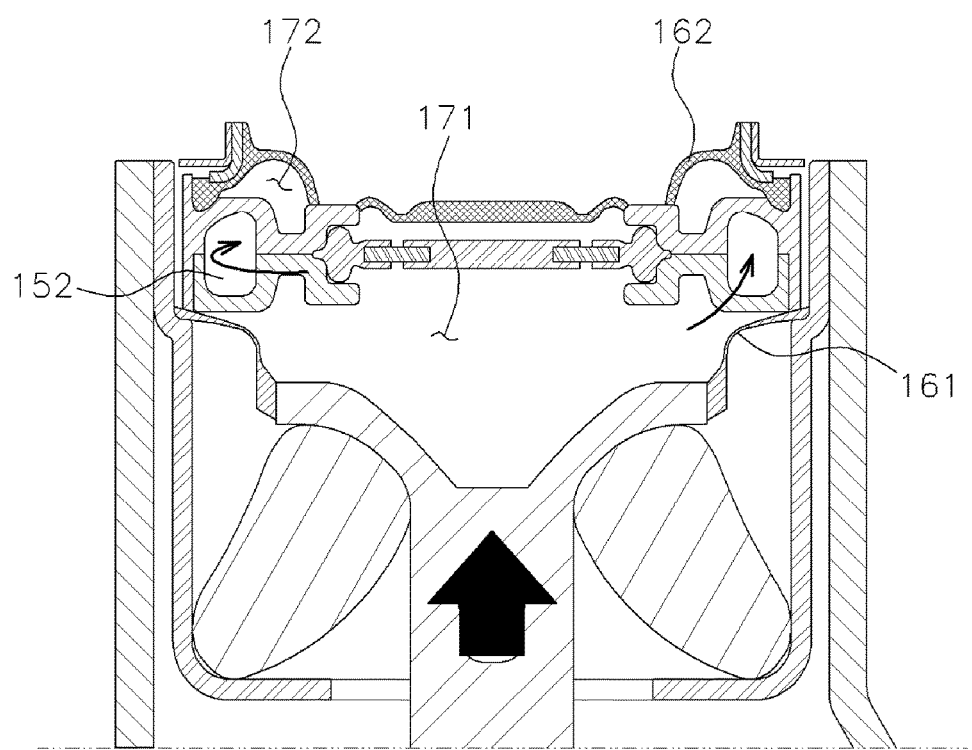

Meanwhile, when the core device 140 is greatly displaced upwards as shown in FIG. 12 and thus a pressure difference equal to or higher than the reference pressure occurs between the lower liquid chamber 171 and the upper liquid chamber 172, the lower liquid chamber 171 and the upper liquid chamber 172 communicate with each other through the second flow path 152 formed in the rim portion of the nozzle plate 151.

Figure 13:
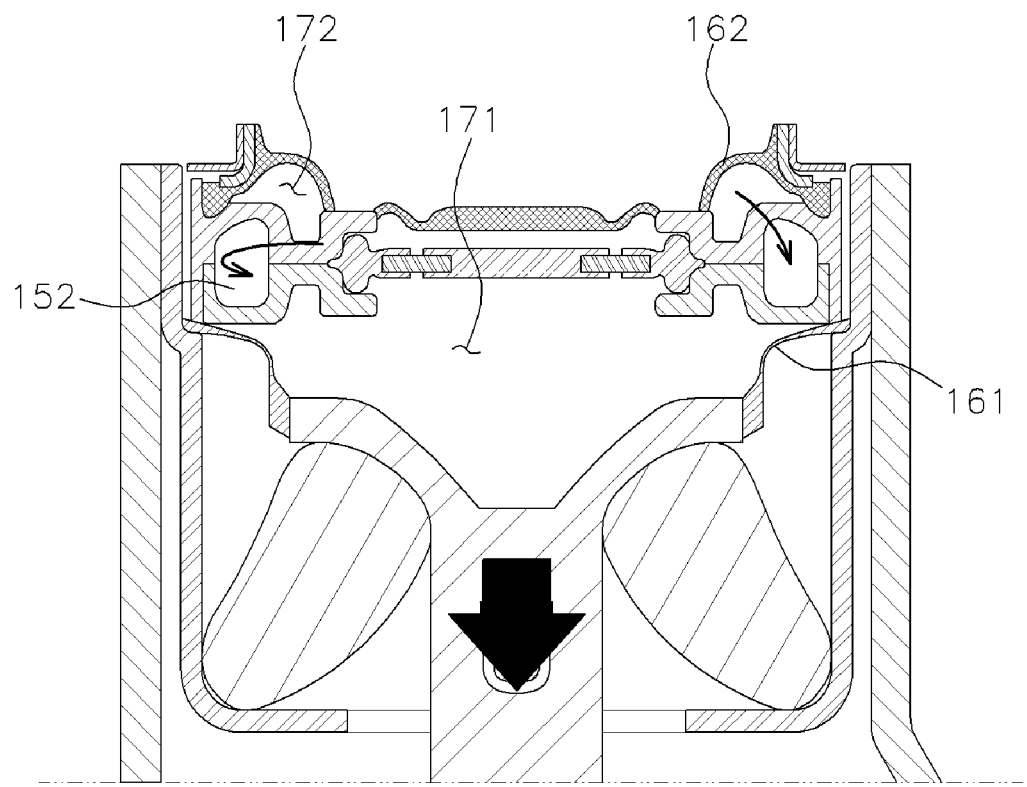

That is, as illustrated in FIG. 12, when the core device 140 is greatly displaced upward and thus pressure in the lower liquid chamber 171 becomes higher than pressure in the upper liquid chamber 172, the fluid in the lower liquid chamber 171 flows to the upper liquid chamber 172 through the orifice of the second flow path 152 but not through the first flow path 153 because the membrane 157 closes the opening 154 of the nozzle device 150. On the contrary, as illustrated in FIG. 13, when the core device 140 is greatly displaced downward and thus pressure in the upper liquid chamber 172 becomes higher than pressure in the lower liquid chamber 171, the fluid in the upper liquid chamber 172 flows to the lower liquid chamber 171 through the second flow path 152 but not through the first flow path 153 because the membrane 157 closes the opening 154 of the nozzle device 150.

Figure 9:
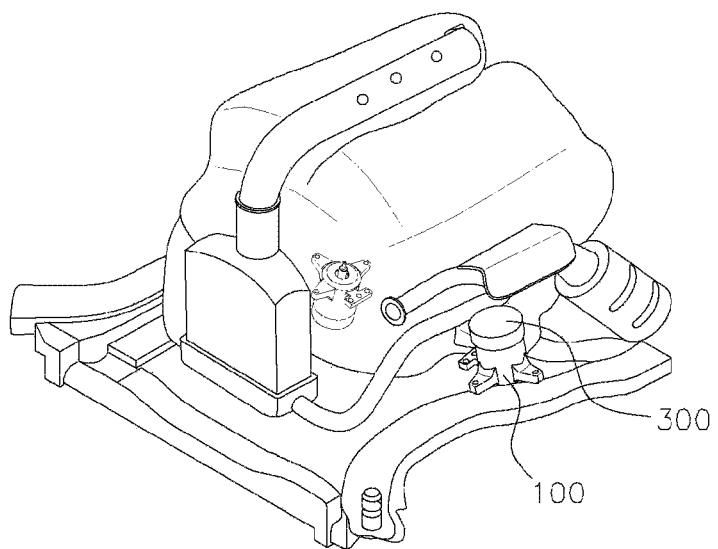
FIG. 9 is a view illustrating a state in which the engine mount according to the exemplary embodiment of the present invention is disposed in an engine compartment.

FIG. 9 is a view illustrating a state in which the engine mount according to the exemplary embodiment of the present invention is disposed in an engine compartment. As illustrated in FIG. 9, the engine mount 10 according to the exemplary embodiment of the present invention has no component that protrudes upward from the mount main body 100, and as a result, the heat radiating device 300 may completely surround an upper portion of the mount main body 100, thereby preventing heat transfer from the heat source at the upper side to the internal of the mount main body 100.

As illustrated in FIG. 8, in an exemplary embodiment of the present invention, the support bracket 200 is inserted into the lower space 110B of the mount housing 110, and the rubber member is disposed, in a reversed state, in the upper space 110A of the mount housing 110, and as a result, a level difference in the up and down directions between the vehicle body fastening portion 115 and the support bracket 200 is reduced, and it is advantageous in view of rigidity at an input point.

The lower liquid chamber 171 is defined by the core device 140, the lower diaphragm 161, and the nozzle plate 151, and thus it is possible to prevent the fluid in the lower liquid chamber 171 from coming into contact with the rubber member 120, and as a result, it is possible to maintain durability even though the rubber member 120 is made of silicone having low oil resistance.

The core device 140 defines the lower liquid chamber, and directly pumps the fluid in the lower liquid chamber, thereby improving pumping performance.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An engine mount apparatus comprising:
   a mount housing which has an internal space therein;
   a partition device which partitions the internal space into an upper space and a lower space;
   a nozzle device having a nozzle plate wherein the nozzle device is provided in the upper space and allows a fluid to selectively pass through the nozzle plate;
   an upper diaphragm which is mounted to an upper surface of the nozzle plate and defines an upper liquid chamber with the nozzle device;

a core which is configured to penetrate the partition device, and has an upper portion disposed in the upper space, and a lower portion disposed in the lower space;

a lower diaphragm which extends from and is coupled to the upper portion of the core a lower surface of the nozzle plate, and defines a lower liquid chamber with the nozzle device;

a rubber member which is provided in the upper space, and is configured to connect the upper portion of the core and the partition device; and a support bracket of which a first side is disposed in the lower space so as to penetrate a lateral side of the mount housing, and fastened to the lower portion of the core, wherein a movement of the support bracket is restricted by a first stopper which is formed to protrude upwards from the support bracket and is configured to contact with the partition device when the support bracket moves upward by a predetermined distance and a second stopper which is configured to contact with a lower surface of the mount housing when the support bracket is configured to move downward by a predetermined distance.

2. The engine mount apparatus of claim 1, wherein the nozzle device includes:

a first flow path fluidically-connecting the upper liquid chamber and the lower liquid chamber selectively; and a second flow path fluidically-connected to the upper liquid chamber and the lower liquid chamber.

3. The engine mount apparatus of claim 2, wherein the second flow path includes an orifice.

4. The engine mount apparatus of claim 2, wherein the nozzle plate includes an opening to which a membrane is selectively engaged according to a fluid pressure applied to the membrane to form the first flow path.

5. The engine mount apparatus of claim 1, wherein the core is configured to press a lower side of the lower liquid chamber by a movement of the support bracket.

6. The engine mount apparatus of claim 5, wherein a lower portion of the mount housing is fastened to a vehicle body, and an upper portion of the mount housing is disposed to be directed toward a heat source.

7. The engine mount apparatus of claim 6, wherein the rubber member includes a silicone material.

8. The engine mount apparatus of claim 6, further including:

a heat radiating device which is fastened to an upper end portion of the mount housing, and is configured to prevent heat transfer from the heat source to an internal of the mount housing.

9. The engine mount apparatus of claim 1, wherein the support bracket includes:

a core fastening portion which is fastened to the lower portion of the core; and an engine fastening portion which extends from the core fastening portion and is fastened to an engine.

10. The engine mount apparatus of claim 9, wherein the first stopper, which is provided on an upper surface of the core fastening portion, and the second stopper, which is configured to protrude downward of the support bracket, is provided on a lower surface of the core fastening portion.

11. The engine mount apparatus of claim 6, wherein a cross section of the core has a 'Y' shape, and the lower diaphragm extends from an upper end portion of the core to a rim portion formed on the lower surface of the nozzle.

12. The engine mount apparatus of claim 6, wherein external threads are provided on the lower portion of the core, and a fastener, which has internal threads, is coupled to the lower portion of the core that is configured to penetrate the support bracket.

13. The engine mount apparatus of claim 12, wherein an opening is formed on a bottom surface of the support bracket and the fastener is configured to be coupled to the lower portion of the core through the opening of the support bracket.

14. The engine mount apparatus of claim 1, wherein the support bracket is fastened to the lower portion of the core through an opening formed on the lateral side of the mount housing.

* * * * *